Dec. 12, 1967   R. HUBER   3,357,864
PRIMARY BATTERY HAVING ONE OF THE ELECTRODES
WOUND UP ON A ROTATABLE SHAFT
Filed Dec. 11, 1964

INVENTOR.
RICHARD HUBER
BY
AGENT

United States Patent Office 3,357,864
Patented Dec. 12, 1967

3,357,864
PRIMARY BATTERY HAVING ONE OF THE ELECTRODES WOUND UP ON A ROTATABLE SHAFT
Richard Huber, Ellwangen( Jagst), Germany, assignor to Varta Aktiengesellschaft, Frankfurt am Main, Germany, a corporation of Germany
Filed Dec. 11, 1964, Ser. No. 417,754
Claims priority, application Germany, Dec. 14, 1963, V 25,032
12 Claims. (Cl. 136—113)

The present invention relates to primary batteries, and more particularly to improvements in flat primary batteries in which one of the electrodes is kept apart and stored separately from the electrochemical system of the battery before starting operation thereof.

Primary cells in which an essential constituent of the electrochemical system is introduced into the cell just before the cell is put in operation, are known. Usually, such cells are so designed that the electrolyte is added to the system at the moment when operation is started. However, such cells have found only limited application. This is due to the necessity of providing additional space for storing the electrolyte and devices for releasing the electrolyte when desired.

It has been suggested to keep the electrodes of dry cells of the cylindrical type arranged coaxially but separated and isolated from each other and to telescope these electrodes when starting operation of the dry cell. Such a construction, however, requires about twice the space of a normal dry cell in the inactive state. It follows that this solution of the problem cannot always be used.

It is one object of the present invention to provide a valuable primary battery in which one of the electrodes of its electrochemical system is kept and stored separately in a simple and highly effective manner before putting the battery into operation.

Other objects of this invention and advantageous features thereof will become apparent as the description proceeds.

In accordance with the present invention one of the electrodes of a primary battery is wound on a rotatable shaft out of contact with the other components of said battery, said shaft, and sufficient space for the electrode, being provided separately from said other components. In order to put the battery into operation, the electrode is unwound from said shaft and brought in contact with the other components of the electrochemical system of the battery. Thus, the wound electrode can be accommodated in the smallest possible space, thereby only slightly increasing the space requirements of the cell.

Preferable embodiments of the present invention are shown in and will be described hereinafter by the attached drawings of which FIG. 1 is a cross-sectional view through a primary battery;

Like reference numerals in these FIGS. 1 to 4 indicate like parts of the primary batteries illustrated. These FIGS. 1 to 4 illustrate primary batteries of the flat type to which the present invention is preferably applied.

Figure 1:
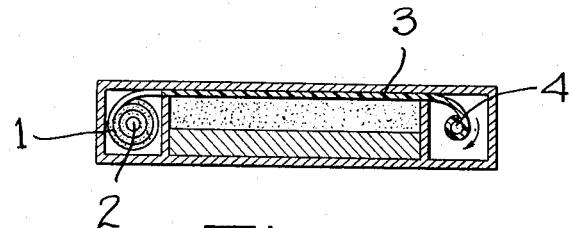

As shown in FIG. 1, electrode 1 in the form of a strip, a foil, a net, or the like is kept and stored in wound condition on rotatable shaft 2. Plastic strip 3 is affixed to the free end of the wound electrode. Said strip is conducted through the cell and is attached to rotatable shaft 4. In order to activate the cell, the electrode is unwound and drawn into the electrochemical system of the cell by turning shaft 4.

Figure 2:
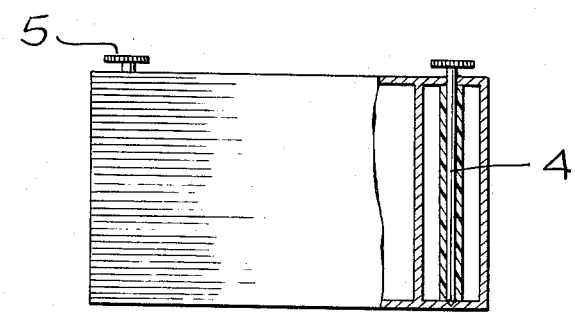
FIG. 2 is a top view, partly in section of such a primary battery.

It is also possible to draw automatically the electrode strip, foil, net, or the like into the cell by the action of a spiral spring which may be actuated and unlocked by means of a push button or a lever. Shaft 2 may be provided with rotary knob 5 to again separate the electrode from the electrochemical system of the cell and to wind it on shaft 2, when placing the battery out of operation. FIG. 2 shows rotary knob 5 and shaft 4 in cross-sectional view.

Figures 3, 4:
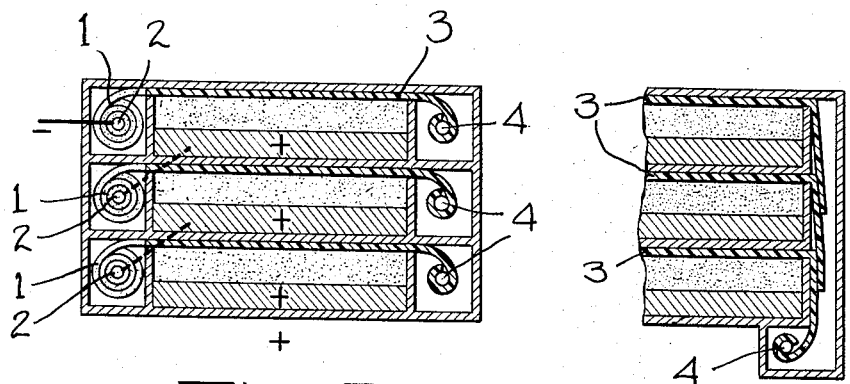
FIG. 3 shows three superposed dry cells of the type of FIG. 1 in cross-sectional view.
FIG. 4 shows part of the dry cells of FIG. 3 in cross-sectional view and illustrating another embodiment of this invention.

FIG. 3 illustrates a battery according to the present invention which is composed of three flat cells. These cells with their rotatable shafts 2 and 4, their electrodes 1 wound on shafts 2, and their plastic strips 3 attached to shafts 4 are superposed and may be connected in series or in parallel.

All the plastic strips of these cells may be attached to the single rotatable shaft 4 provided in one of the cells as shown in FIG. 4. As a result thereof, all electrode strips are drawn simultaneously into the cell, thereby activating the batteries.

Which one of the electrodes of the primary cell or cells is kept separate from the other active components thereof and is wound on shafts 2 before starting operation of the cells, depends on the electrochemical system used in the cells. Preferably the negative electrode is kept separate because it is more liable to corrosion and self-discharge than the positive electrode.

The design according to the present invention has been found highly effective not only for commonly used electrochemical systems but also for primary batteries which can not be stored without loss in capacity.

The following examples serve to illustrate the present invention without, however limiting the same thereto.

EXAMPLE 1

Primary cell with zinc and silver chloride

The storability of dry cells of this type is quite limited due to the diffusion of silver ions to the zinc electrode. Silver chloride is available in the form of flexible thin foils so that the wound electrode may be either a zinc foil or a silver chloride foil.

EXAMPLE 2

Primary cell with magnesium and manganese dioxide

Magnesium is unstable in aqueous electrolyte solutions. Therefore, the magnesium electrode is stored separately from the electrochemical system of the cell before use so as to avoid corrosion. Since magnesium and magnesium alloys which are suitable as electrodes in primary batteries are relatively brittle, thin foils or nets of said metal or alloys are selected as electrode.

EXAMPLE 3

Primary cell with zinc, sulfuric acid and lead dioxide

Heretofore, this system could not be used successfully because of the strong corrosion of zinc in acid solutions. According to the present invention, the zinc electrode is kept and stored separately from the electrochemical system. Such cells can be stored for an almost unlimited time.

While the present invention has been described and illustrated in conjunction with certain preferred embodiments, it will be clearly understood that many modifications and variations may occur to the skilled in the art, particularly after they have been benefited from the present teaching, without departing from the spirit and

I claim:

1. Primary battery comprising a cell having two dissimilar electrodes and an electrolyte, being characterized by having one of its electrodes wound up on a rotatable shaft and, in such wound up condition, being kept separate from and out of contact with the other components of the electrochemical system of the battery before its use, said primary battery being provided with means to unwind said electrode and to bring it in contact with the electrolyte upon putting the battery into operation, and being further characterized in that the means for unwinding the wound electrode comprises a rotatable shaft and a plastic strip attached at its one end to the free end of the wound electrode and at its other end to the rotatable shaft, said plastic strip and other electrode being in contact with the electrolyte, said rotatable shaft being adapted on rotation thereof to put the battery into operation by winding up the plastic strip and unwinding the wound electrode, therein causing the latter electrode to contact the electrolyte of the battery.

2. Primary battery comprising a plurality of cells according to claim 1 juxtaposed to one another and wherein the plastic strips therein are attached in common to said rotatable shaft for simultaneous unwinding of said plastic strips and the attached electrodes on putting the battery into operation.

3. Primary battery according to claim 1, wherein the electrodes consist of zinc and silver chloride and wherein one of said electrodes is kept separate from and out of contact with the other components of the electrochemical system of the battery when not used.

4. Primary battery according to claim 1, wherein the electrodes consist of magnesium and manganese dioxide and wherein the magnesium electrode is kept separate from and out of contact with the other components of the electrochemical system of the battery when not used.

5. Primary battery according to claim 1, wherein the electrodes consist of zinc and lead dioxide and the electrolyte is sulfuric acid and wherein the zinc electrode is kept separate from and out of contact with the other components of the electrochemical system of the battery when not used.

6. Primary battery according to claim 1 wherein one of the electrodes has a planar configuration, and the other electrode is a flexible electrode, wherein the battery includes storage means for storing the flexible electrode wound up on the rotatable shaft, and wherein the means for unwinding unwinds the flexible electrode from the storage means into conductive relationship with the electrolyte and spaced evenly from the planar electrode.

7. Primary battery according to claim 6 having a major compartment containing the electrode having the planar configuration and an electrolyte in contact therewith and having as the storage means a minor compartment adjacent the major compartment.

8. In a battery having a major compartment containing an electrode and an electrolyte, a pair of minor compartments spaced from one another and flanking the major compartment with each minor compartment containing a rotatable shaft, a flexible electrode attached at its opposite ends to the respective shafts and adapted to be unwound from one shaft across the intervening space within the major compartment, both the flexible electrode and the other electrode being in conductive relationship with the electrolyte when the flexible electrode is in the major compartment.

9. In a battery having a major compartment containing an electrode and an electrolyte in contact therewith, an adjacent minor compartment communicating with the major compartment by way of a slit therebetween, a flexible electrode wound up in the minor compartment, a flexible strip extending through the slit, the strip being attached at its one end to the free end of the wound flexible electrode, means attached to the other end of the flexible strip and movable to draw the attached flexible electrode through the slit and into the major compartment and into conductive relationship with the electrolyte therein.

10. In a battery having a major compartment containing an electrode and an electrolyte in contact therewith, an adjacent minor compartment communicating with the major compartment by way of a slit therebetween, a flexible electrode wound up in the minor compartment, a flexible strip occupying essentially all of the slit, the strip being attached at its one end to the free end of the wound flexible electrode, shaft means attached to the other end of the flexible strip and rotatable to draw the attached flexible electrode through the slit and into the major compartment and into conductive relationship with the electrolyte therein.

11. In a battery having a major compartment containing an electrode and an electrolyte in contact therewith, an adjacent minor compartment communicating with the major compartment by way of a slit therebetween, a flexible electrode wound up in the minor compartment, a flexible non-conductive strip extending through the slit, the strip being attached at its one end to the free end of the wound electrode, means outside the major compartment and attached to the other end of the flexible strip and movable to draw the attached flexible electrode through the slit and into the major compartment and into conductive relationship with the electrolyte therein.

12. In a battery having a major compartment containing an electrode and an electrolyte in contact therewith, an adjacent minor compartment communicating with the major compartment by way of a slit therebetween, a flexible electrode wound up in the minor compartment, a flexible non-conductive strip extending through the slit, the strip being attached at its one end to the free end of the wound electrode, rotatable shaft means inside the battery but outside the major compartment and attached to the other end of the flexible strip and rotatable to draw the attached flexible electrode through the slit and into the major compartment and into conductive relationship with the electrolyte therein.

References Cited

UNITED STATES PATENTS

| | | | |
|---|---|---|---|
| 270,702 | 1/1883 | Scrivanow | 136—113 |
| 1,899,615 | 2/1933 | Heise | 136—113 |
| 2,547,186 | 4/1951 | Walker | 242—71.2 X |
| 2,925,455 | 2/1960 | Eidensohn et al. | 136—86 |
| 3,208,882 | 9/1965 | Markowitz | 136—86 |
| 3,260,620 | 7/1966 | Gruber | 136—86 |
| 3,266,937 | 8/1966 | Lyons | 136—86 |

WINSTON A. DOUGLAS, *Primary Examiner.*

B. J. OHLENDORF, A. SKAPARS, *Assistant Examiners.*